United States Patent [19]

Goodell et al.

[11] 4,431,043

[45] Feb. 14, 1984

[54] AUTOMATIC TIRE INFLATION SYSTEM

[75] Inventors: Fred L. Goodell, Grosse Ilse; Michael J. Ellison, Canton, both of Mich.

[73] Assignee: AM General Corporation, Detroit, Mich.

[21] Appl. No.: 311,855

[22] Filed: Oct. 16, 1981

Related U.S. Application Data

[63] Continuation-in-part of Ser. No. 288,834, Jul. 31, 1981.

[51] Int. Cl.³ .................... B60C 23/10; B60C 29/00
[52] U.S. Cl. .................................. 152/417; 137/224;
137/351; 152/401; 152/427; 277/153; 285/111;
285/190; 285/272; 301/105 R; 301/126;
301/132; 308/208
[58] Field of Search ............... 152/415, 416, 417, 427,
152/388, 389, 391, 392, 401, 405; 137/224, 351;
301/105 R, 126, 131, 132; 285/111, 190, 272;
277/152, 193; 308/208

[56] References Cited

U.S. PATENT DOCUMENTS

| | | | |
|---|---|---|---|
| 1,800,780 | 4/1931 | Daneel | 152/417 |
| 2,577,458 | 12/1951 | Gaiptman | 152/416 |
| 2,634,782 | 4/1953 | Turek et al. | 152/417 |
| 2,634,783 | 4/1953 | Turek et al. | 152/417 |
| 2,693,841 | 11/1954 | Webster, Jr. | 152/417 |
| 2,715,430 | 8/1955 | Lindeman | 152/416 |
| 2,849,047 | 8/1958 | Lamont et al. | 152/417 |
| 2,944,579 | 7/1960 | Kamm et al. | 152/416 |
| 2,976,906 | 3/1961 | Kamm et al. | 152/416 |
| 3,362,452 | 1/1968 | Harnish | 152/416 |
| 3,495,843 | 2/1970 | Anderson et al. | 277/153 X |
| 3,705,614 | 12/1972 | Juttner et al. | 152/417 |
| 4,019,552 | 4/1977 | Tsuruta | 152/417 |
| 4,154,279 | 5/1979 | Tsuruta | 152/416 |

*Primary Examiner*—William A. Powell
*Assistant Examiner*—Thomas Bokan
*Attorney, Agent, or Firm*—Krass, Young & Schivley

[57] ABSTRACT

An automatic tire inflation/deflation system for a vehicle (10) is disclosed. Air passageways for the pressurize air are provided internally through the wheel assemblies without cutting into load bearing members. A rotating seal is provided by way of a pair of sealing rings (52,54) located inboard of the hub bearings (32,33) to protect the seals from adverse environmental conditions. A kit for retrofitting vehicles to include an automatic tire inflation/deflation system is also disclosed. Ramp surfaces (90, 91, 92) formed in the hub (30') are provided to facilitate removal of the bearing assemblies (32, 33).

10 Claims, 9 Drawing Figures

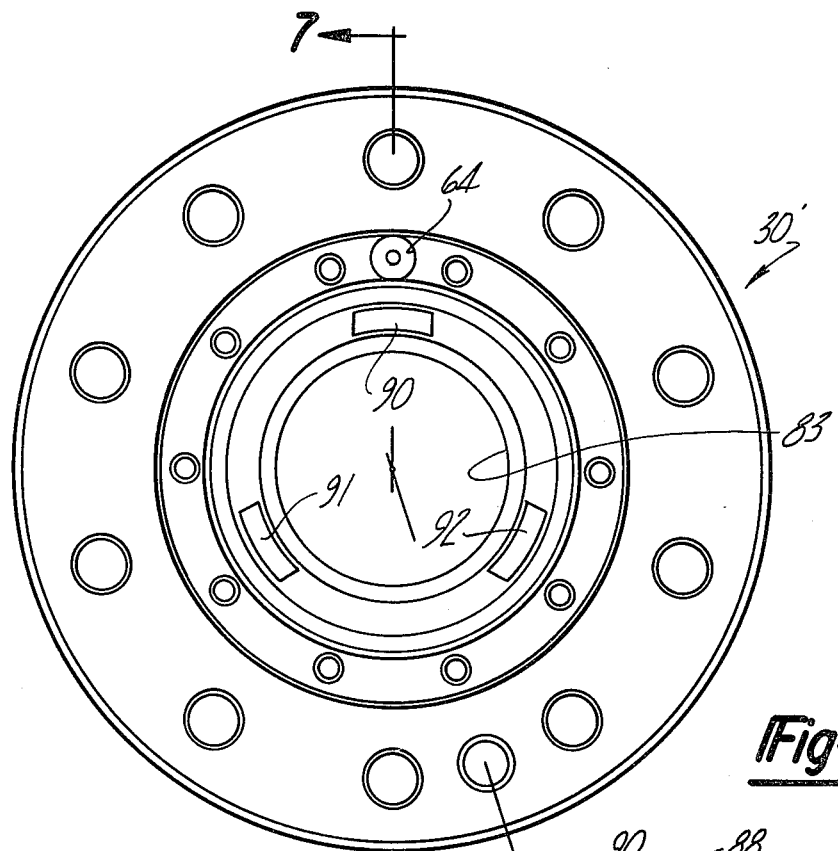
Fig-6
Fig-7
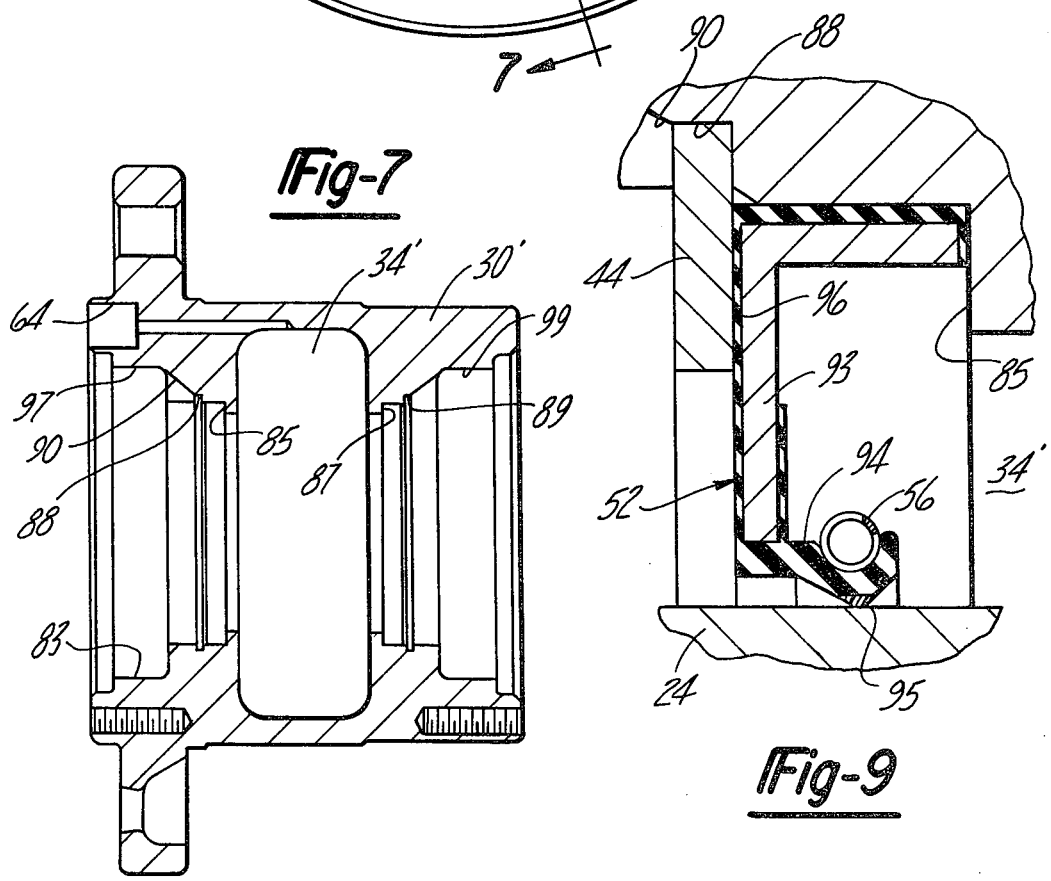
Fig-9

AUTOMATIC TIRE INFLATION SYSTEM

CROSS REFERENCE TO RELATED APPLICATION

This application is a continuation-in-part application of U.S. Ser. No. 288,834 entitled "Automatic Tire Inflation System" by Fred L. Goodell et al, filed July 31, 1981.

TECHNICAL FIELD

This invention relates generally to tire inflation systems and, more particularly, to apparatus for automatically regulating the pressure in vehicular tires.

BACKGROUND ART

It is well known that the traction of vehicles on soft terrain may be greatly improved by decreasing the pressure within the tires. By decreasing the pressure, the tire supporting surface will increase thereby enlarging the contact area between the tires and the terrain. Additionally, it is often desirable to decrease the tire pressure to increase riding comfort on rough roads. On the other hand, higher tire pressures decrease rolling resistance and tire carcass temperatures on smooth roads thereby increasing economy and safety.

It would be desirable to be able to adjust the pressure within the tires without having to stop the vehicle and manually inflate or deflate the tires. This is especially true for military vehicles which usually travel in columns, many times under conditions whereby stoppage of the vehicle would delay the entire column. Additionally, if the military vehicle is under enemy attack it is imperative that the vehicle maintain its maneuverability for as long as possible. If a tire has been punctured by gunfire or the like it is necessary to be able to at least partially inflate the tires very quickly so that the vehicle remains usable.

Various automatic tire inflation systems have been used in the past to alleviate one or more of these problems. One such system was standard equipment on U.S. Army vehicles known as the "Duk" which were used in World War II. This technique used a so-called Schrader valve system in which air pressure was supplied through long wand-like conduits which protruded from the vehicle wheel openings in the frame and fed air into rotating couplings connected to the exterior of the hubs. A second line from the inboard edge of the rotating couplings were connected to the valve stems in the inner tubes for the tires.

One of the problems with this approach was its extreme vulnerability to damage since the conduits which carried the air were exposed to the rough terrain over which the vehicles passed. The conduits were subject to being broken or damaged by coming into contact with brush, rocks, or other vehicles.

In an attempt to improve upon this system there have been several reported attempts to provide an internal air pressure feed technique that would not be subject to such abuse. It is believed that some of the vehicles used in the U.S.S.R. and its satellite countries have used automatic tire inflation systems in which air from a compressed air source is routed through the wheel assembly and into the tire. Additionally, the following U.S. Patents form a representative, but not exhaustive, list of various other approaches to automatic tire inflation systems: U.S. Pat. No. 2,693,841 to Webster, Jr.; U.S. Pat. Nos. 2,944,579 and 2,976,906 to Kamm et al; U.S. Pat. Nos. 2,634,783 and 2,634,782 to Turek et al; U.S. Pat. No. 2,577,458 to Gaiptman; U.S. Pat. No. 2,849,047 to Lamont et al; U.S. Pat. No. 3,362,452 to Harnish; U.S. Pat. No. 1,800,780 to Daneel; U.S. Pat. No. 3,705,614 to Juttner et al; U.S. Pat. No. 2,715,430 to Lindeman; and U.S. Pat. Nos. 4,019,552 and 4,154,279 to Tsuruta.

One of the major drawbacks of these various approaches is that they generally require a substantial amount of operator attention to achieve the desired air pressure. For the most part, these systems require an operator to activate an inflate or deflate switch and then continually monitor an air pressure gauge until the desired pressure is reached at which time the operator must deactivate the switch. Moreover, no provision was made for accurately and automatically maintaining the tire pressure once initially set by this operation. These problems are especially acute when the vehicle is under enemy attack where the soldier's time could be much better spent in defending himself than in watching gauges.

Equally unsatisfactory is the prior art approach to controlling the inflate/deflate valve. In the past only one control valve was generally used which gradually opened or shut depending on the pressure differential between the desired and actual pressure within the tires. For example, as the pressure differential decreased the valve gradually shut off until there was equilibrium. Unfortunately, this technique unduly increased the inflate/deflate cycle time which is extremely important under battle conditions.

A simple, yet reliable seal for the air passageway between the rotating and nonrotating members of the wheel assembly has been difficult to obtain in the past. Many of the prior art approaches have been relatively complex and hard to assemble. Commonly used air seals with one or more generally vertically extending sealing flaps may have a tendency to lift up from their surfaces under high pressure thereby destroying the integrity of the seal. Still other seal designs were located outside of the bearings and exposed to adverse environmental conditions reducing their useful lives.

Many of the internal air feed wheel assemblies cut into load bearing members (e.g. axles, shafts) to form the air passageways. This unfortunately reduces the strength in these members. Some of the prior approaches also required relocation of the bearings from their originally designed position thereby often necessitating redesign of related parts at additional cost.

Many of the military vehicles currently in use still have many years of useful lives left or they are still in production. In some instances it would be desirable to modify these vehicles at low cost to include an automatic tire inflation system. However, many of the prior art approaches are specifically designed for a particular application and cannot easily be incorporated into conventionally used military vehicles such as M809, M44A2 and M939 military trucks.

The present invention is directed to solving one or more of the problems set forth above.

DISCLOSURE OF THE INVENTION

According to one aspect of the present invention, a wheel assembly is disclosed for use in an automatic tire inflation system. Means are defined in the wheel assembly to locate a pair of sealing rings completely inboard of the hub bearings. The sealing rings include a flexible generally horizontally extending lip portion which rides on nonrotating portions of the wheel assembly. An air passageway from the nonrotating portion to the rotating portion of the wheel assembly is formed exclusively in non-loadbearing members. The design of the present invention serves to provide a simple, yet reliable rotating air seal construction in the transitional area of the air passageway where the nonrotating and rotating portions meet. In one embodiment, a sleeve is fixed to a conventional hub and is used to locate the sealing rings so that standard vehicles may be retrofitted for an automatic tire inflation system.

In another embodiment, a hub is constructed of a single piece of cast metal having an annular inner surface defining a central passageway through which a non-loadbearing spindle passes. The hub is mounted for rotation about the spindle on a pair of spaced bearings. An axle extends through the spindle and is connected to the hub to impart rotational movement to the hub. The hub includes a centrally located enlarged interior cavity. Means are provided on the annular surface of the hub on both sides of the cavity for receiving a pair of annular sealing rings. Extending from the inner periphery of each sealing ring is a generally horizontally extending flexible lip seal. The rings are held in place at least in part by receiving means in the annular inner surface of the hub. Preferably, the receiving means includes a shoulder and a spaced groove in which a snap ring resides. The sealing rings are held laterally in place between the shoulders and snap rings. When held in this position the horizontally extending flexible lip portion of the sealing rings rides on the outer surface of the spindle.

Part of the air passageway is provided by a bore in the spindle. Compressed air is routed through the air passageway into the enlarged central cavity in the hub and then to the tires. The relatively high air pressure within the central cavity serves to provide a great deal of downward force on the lip portions of the seals to block air from passing between the rotating and nonrotating portions of the wheel assembly.

In a disclosed embodiment the outer surfaces of the sealing rings are coated with rubber-like material. This rubber coating serves to provide an improved seal between the outer periphery of the sealing rings and the hub. The horizontally extending lip of the sealing ring may include a TEFLON (polytetraflouroethylene) portion on its engagement surface to increase the wear life of the seals under nonlubricated conditions.

Another aspect of this invention is directed towards a kit for retrofitting vehicles to include automatic tire inflation systems. The kit includes a control box which is adapted to be mounted within the cab of the vehicle and includes a selector device for selecting one of a plurality of preset air pressure settings. A valve assembly is provided for mounting onto the body of the vehicle. The valve assembly includes one or more valves which control inflation or deflation of the tires as a function of the preselected pressure settings. Preferably, the kit further includes a static pressure tank which is adapted to be coupled between the inlets of the tires and the valve assembly. The pressure in the static pressure tank is adapted to be maintained at the same pressure as the tires so that the output of the tank may be used as criteria in controlling the operation of the valving assembly. If the vehicle is not already equipped with wheel assemblies adapted for automatic tire inflation systems, then the kit may also include replacement and/or adaptor parts for the wheel assembly. The use of the kit of the present invention allows the vehicle owner to upgrade his equipment to include an automatic tire inflation system with minimal cost and required labor.

BRIEF DESCRIPTION OF THE DRAWINGS

These and other advantages of the present invention will become apparent to one skilled in the art after reading the following specification and by reference to the drawings in which:

FIG. 6 is an end view of a hub made pursuant to an alternative embodiment of this invention;

FIG. 7 is a cross sectional view of the hub along the lines 7—7 of FIG. 6;

FIG. 9 is an enlarged fragmentary view of the rotating seal construction which may be used in both embodiments of the wheel assemblies.

BEST MODE FOR CARRYING OUT THE INVENTION

Figure 1:
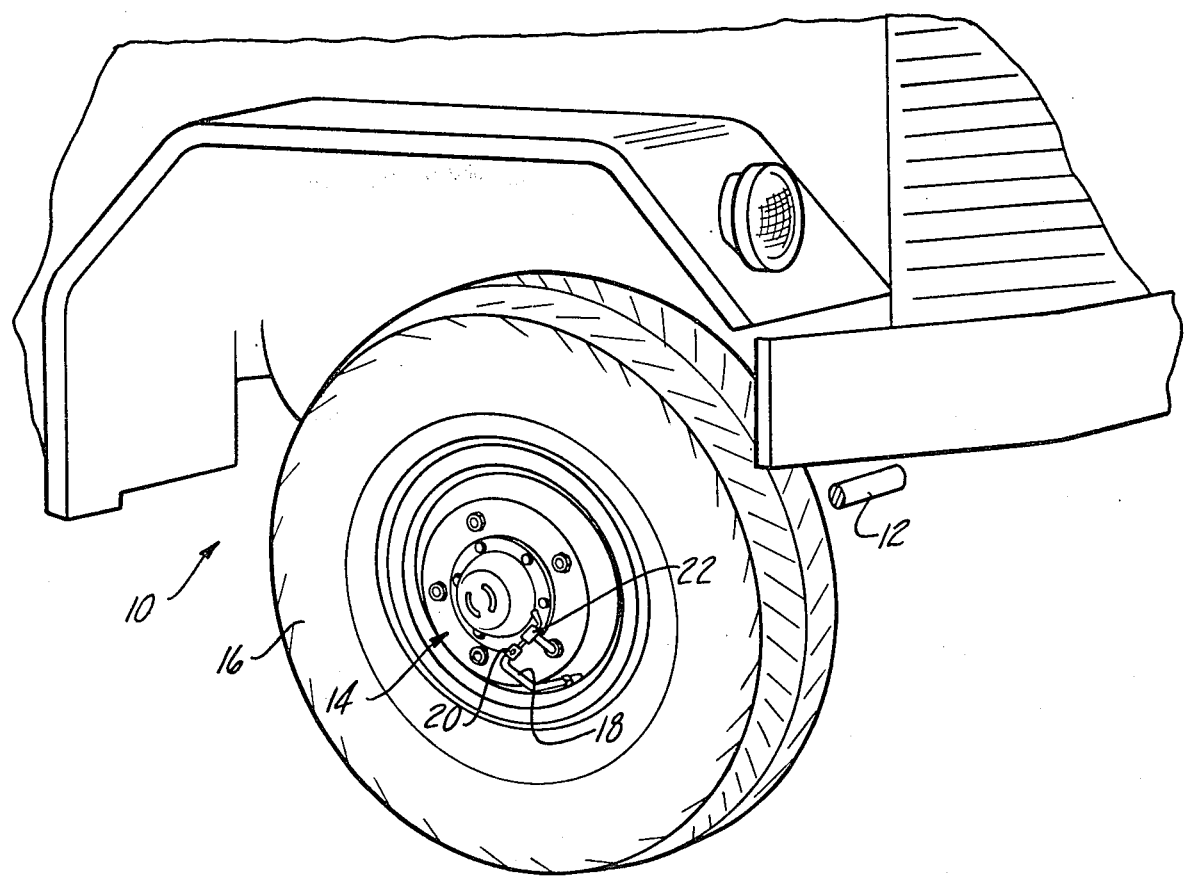
FIG. 1 is a perspective view of a wheel assembly made in accordance with one aspect of this invention.

Certain aspects of the present invention find particular utility in connection with a military vehicle of the type shown in FIG. 1. Vehicle 10 may be a five ton M813 cargo truck built for the U.S. Army by AM General Corporation, the assignee of the present invention. In FIG. 1 a portion of vehicle 10 is shown illustrating a front axle 12 driving wheel assembly 14 onto which tire 16 is mounted. Also shown in FIG. 1 is an air line 18 having a conventional tire inlet valve stem 20 and a manual shutoff valve 22.

It should be understood from the outset that while this invention will be described in connection with a particular type of vehicle, the broader concepts embodied in this invention can be used in other types of vehicles such as buses, heavy duty trucks, vans and the like. Therefore, the particular embodiments described in this specification should not be construed to be limiting examples.

Figure 2:
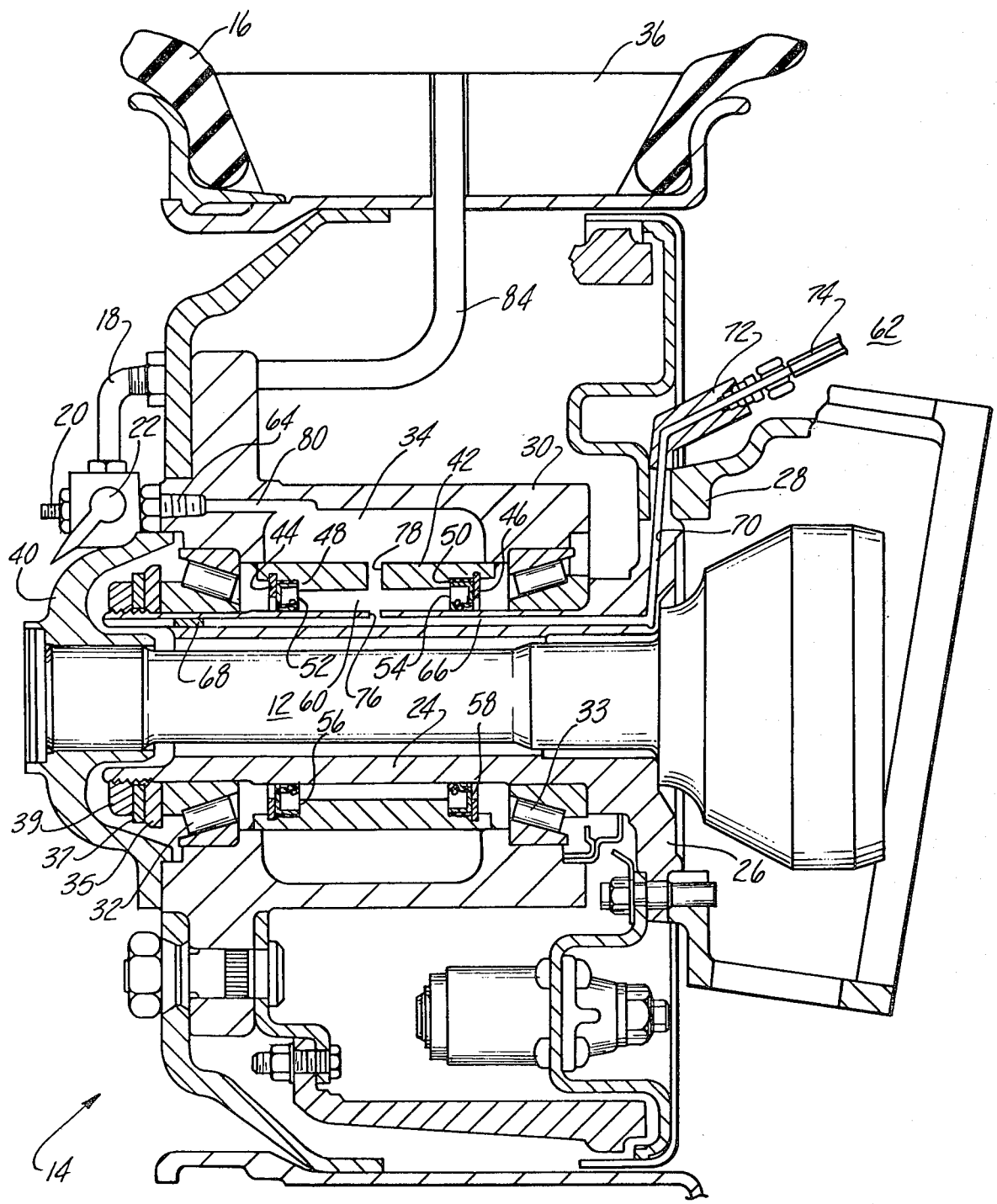
FIG. 2 is a cross sectional view of the wheel assembly shown in FIG. 1.
Figure 3:
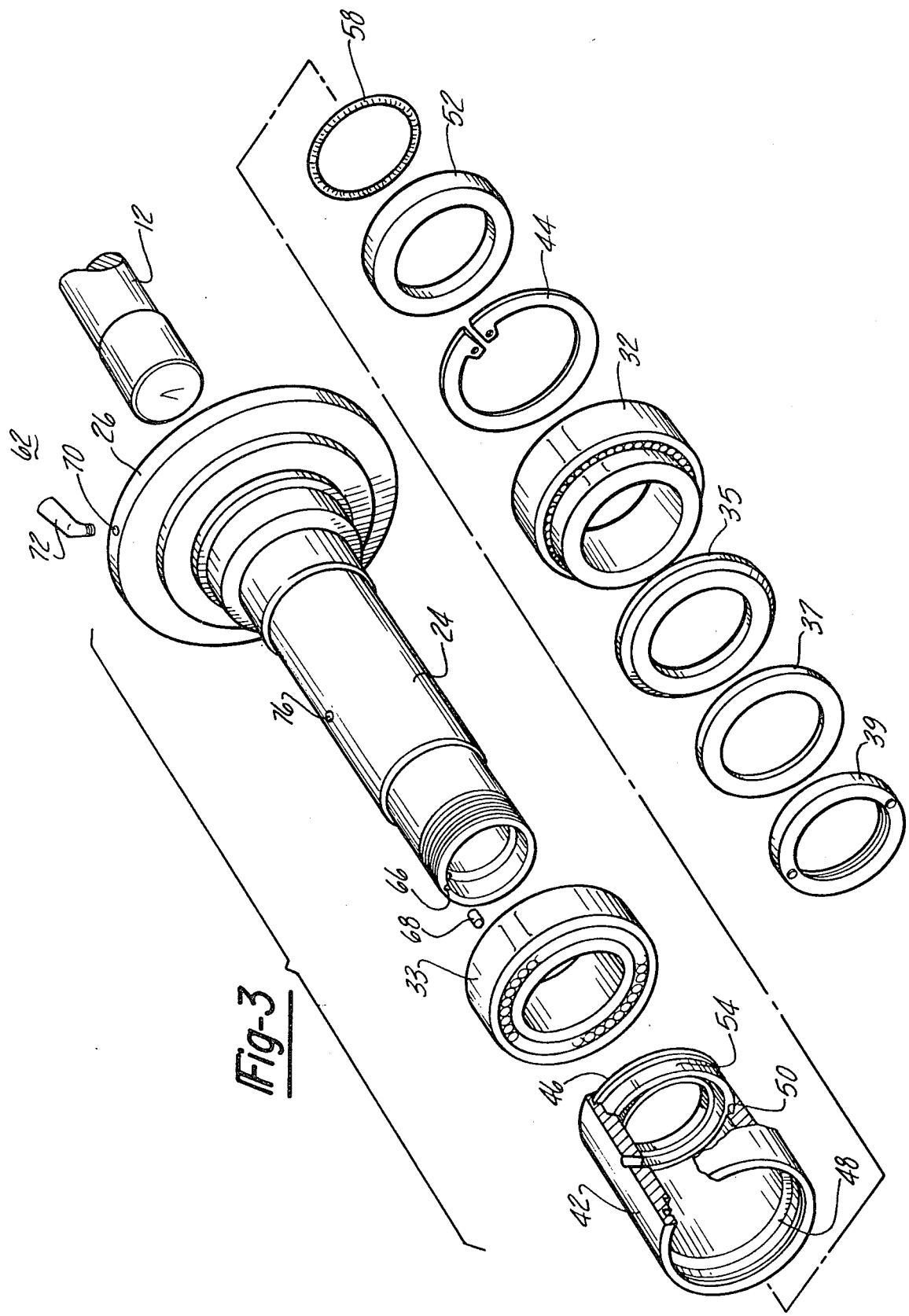
FIG. 3 is an exploded perspective view of portions of the wheel assembly.

Turning to FIGS. 2 and 3, wheel assembly 14 includes a tubular spindle 24 whose inboard portion expands somewhat to form a back flange 26. Spindle 24 is stationary, i.e., nonrotatable, since back flange 26 is bolted to the vehicle chassis 28. Hub 30 is mounted for rotation about spindle 24 by way of conventional bearings 32, 33. The left hand bearing 32 is held in place by way of members 35, 37, and 39. Hub 30 includes a centrally disposed cavity 34 therein. Tire 16 is mounted about the outer periphery of hub 30 using known techniques incorporating bead lock 36. Axle 12 passes though the hollow spindle 24. The inboard portion of axle 12, for a driven wheel, is coupled to a suitable source of rotational power such as a differential. The outer end of axle 12 includes splines (not shown) which engage corresponding slots in drive flange 40. Drive flange 40, in turn, is bolted to hub 30 to impart rotational movement to tire 16 in unison with the rotation of axle 12.

The wheel assembly thus far described is conventional. Pursuant to the present invention, wheel assembly 14 can be readily modified so as to provide a sealed rotating air coupling with a minimum amount of modification. An annular sleeve 42 has its outer edges connected, as by welding, to hub 30 so that the sleeve 42 generally bridges central cavity 34 in hub 30. The interior portions of sleeve 42 include two spaced grooves for receiving snap rings 44, 46. Sleeve 42 also provides shoulders 48 and 50 which oppose snap rings 44 and 46, respectively.

The pair of snap ring-shoulder combinations in sleeve 42 defines a seat for receiving the outer peripheral surfaces of sealing rings 52, 54. Sealing rings 52, 54 are in the form of open-ended annular channels having a rigidly constructed outer body and a flexible inner lip seal preferably made of synthetic rubber. Garter springs 56, 58 provide radially inward compressive forces on the flexible lip seals which ride on the outer surface of spindle 24. This arrangement defines an interior chamber 60 which surrounds spindle 24. More will be said about sealing rings 52, 54 later herein.

Provision is now made for making a sealed air passageway between an inlet 62 in the non-rotating portion of wheel assembly 14 and an outlet 64 in the rotating hub 30. A first bore 66 is drilled in sleeve 24 throughout substantially its entire length, preferably by a rifle drilling technique. The left hand portion of bore 66 is sealed off with a plug 68. A second downwardly extending bore 70 in flange 26 is drilled until it meets the right hand portion of bore 66. A generally L-shaped fitting 72 is welded to the spindle to extend bore 70 so that it can be readily coupled to an air source delivered by hose 74. A generally orthogonally directed opening 76 extends between chamber 60 and the first bore 66 in spindle 24. Sleeve 42 similarly includes an opening 78 so that air can communicate between chamber 60 and cavity 34. A third bore 80 is then drilled in hub 30 which extends into cavity 34 to provide a passageway between threaded outlet 64 and cavity 34.

Air supplied to inlet 62 passes through bores 70 and 66, then out of opening 76 in the stationary portion of the wheel assembly 14. The air next passes out of opening 76 and into chamber 60. Air is prevented from escaping to the outside environment by way of the sleeve 42 and air seals 52, 54 which rotate with hub 30. When there is compressed air in chamber 60 the air seals 52, 54 are urged against spindle 24 and their respective retaining rings 44, 46 thereby providing excellent protection from escape of the air. The air in chamber 60 passes through opening 78 into cavity 34 and thence through bore 80 to outlet 64.

Pursuant to a feature of this invention a manual shutoff valve 22 is connected to outlet 64. Downstream of shutoff valve 22 is a manual fill line or valve stem 20. Consequently, the user may manually fill tire 16 by closing shutoff valve 22 to block outlet 64 so that the air can be supplied externally through stem 20 which passes through tube 18 back through hub 30 which, in turn, communicates with a line 84 which enters the interior portion of tire 16. Under normal operating conditions, however, the air to the tires is supplied automatically.

Instead of modifying conventional wheel assemblies by the use of the sleeve construction previously discussed, it may be desirable to provide an entirely new hub design instead of, or as a replacement for, those hubs which are not adapted for automatic tire inflation systems. Pursuant to another aspect of this invention an alternative wheel assembly design is provided as shown in FIGS. 6–9. To a large extent the wheel assembly of this alternative embodiment is quite similar to the previously described embodiment. Consequently, the same reference numerals will be used to designate like parts. A major difference between the two embodiments is that the latter embodiment employs a new hub design in contrast with the use of conventional hubs discussed in the previous embodiment.

Figure 8:
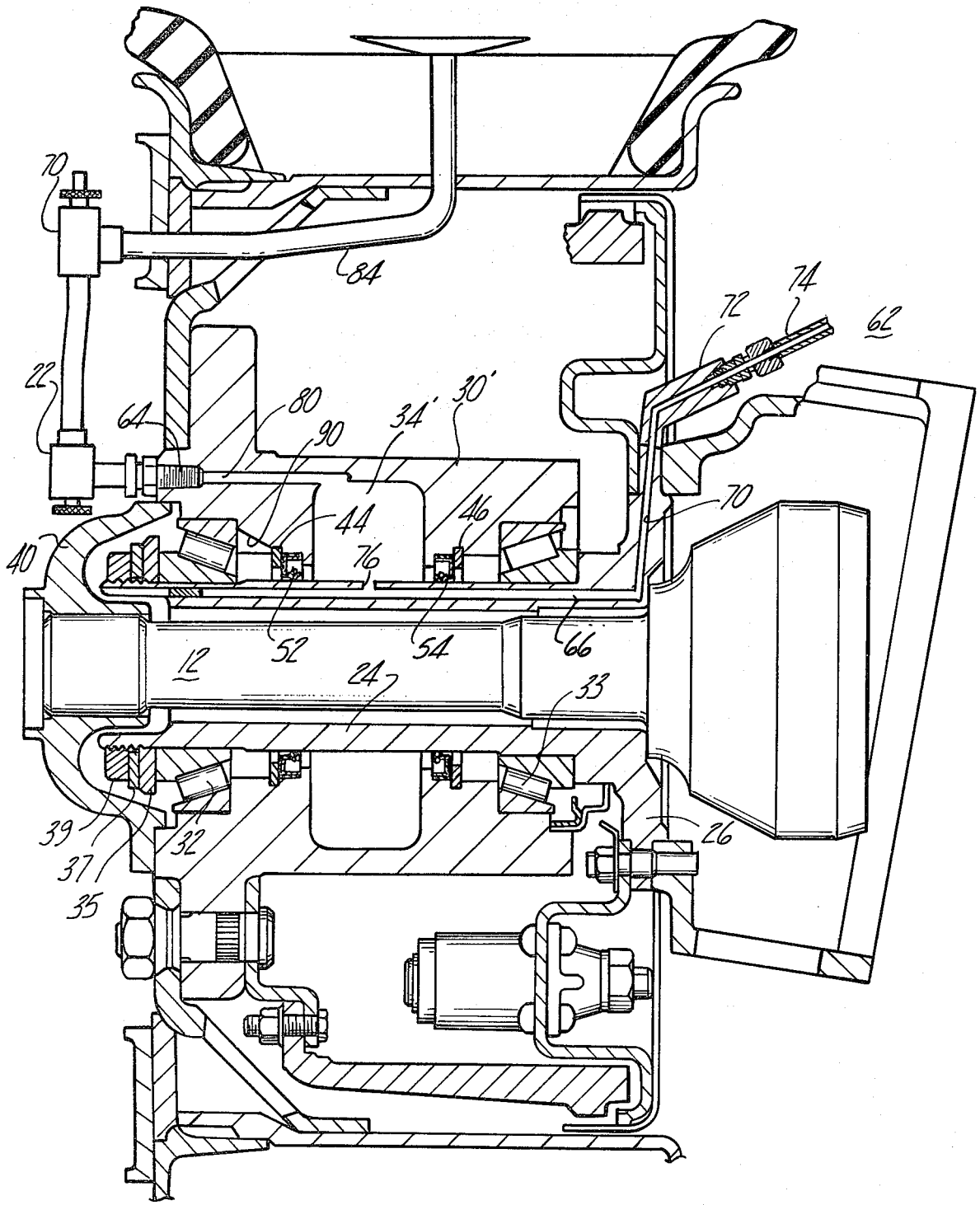
FIG. 8 is a cross sectional view of a wheel assembly made in accordance with an alternative embodiment of this invention.

Turning then to FIGS. 6–8, hub 30' is a one-piece metal construction preferably cast from grade I or II malleable iron. The central aperture through hub 30' is defined by an annular inner surface generally designated by the numeral 83. A pair of shoulders 85, 87 are formed in surface 83, one on each side of cavity 34'. A pair of grooves 88, 89 are also formed in surface 83 spaced a predetermined distance from shoulders 85 and 87, respectively. In this embodiment hub 30' includes a plurality of equally spaced ramp surfaces 90, 91 and 92 located inboard of the annular surface for receiving the bearings. Such a construction allows the bearing assembly to be easily extracted from the hub, for example, to replace them. The bearing assemblies can be removed by a device having three reversely curled fingers. The bearings are extracted by extending the fingers through the central opening in the bearing assembly, expanding them into ramp surfaces 90, 91 and 92, and then retracting them taking with them the bearing assembly.

Giving special attention now to FIGS. 8 and 9, snap rings 44 and 46 are located in grooves 88 and 89, respectively. Sealing ring 52 is held laterally in place between snap ring 44 and shoulder 85. Similarly, sealing ring 54 is held in place between snap ring 46 and shoulder 87 of hub 30'. FIG. 9 illustrates the details of the sealing rings which can be used in both of the embodiments. The body 93 of each sealing ring is made of a rigid material such as steel. Body 93 defines the vertical edge portion and the outer peripheral portion or leg of the device. The inner peripheral portion is defined by a generally horizontally extending flexible lip 94 which is made of a relatively high durometer polymeric rubber material. Preferably, the lip 94 is made of Nitrile polymer having a 40–45 durometer. In this particular embodiment lip 94 includes a tip 95 of wear resistant material. In this example tip 95 is made of TEFLON (polytetraflouroethylene) which is formed by including a ring of TEFLON in the molding process when lip 94 is made and then by machining the TEFLON ring thereafter as desired. The tip 95 provides a self-lubricating engagement surface which prolongs the sealing affect when there is little or no lubricant on spindle 24. The outer surface of body 93 is preferably coated with a thin layer of sealing material. In the preferred embodiment coating 93 is a rubber-like polymer and, more particularly, is made of Nitrile polymer having a 10–15 durometer. As an alternative to the use of a Nitrile lip with a TEFLON insert, the lip portion may be made with Viton which tends to exhibit good high temperature and low abrasion characteristics.

It can now be appreciated that the sealing construction of both embodiments provides substantial advantages over the construction of the prior art. It is relatively simple and easy to assembly since there are very few individual parts. The present invention further provides an excellent rotating seal which blocks air from escaping between the nonrotating and rotating parts of the wheel assembly. When cavity 34 or 34' contains compressed air the lips 94 of the sealing rings 52 and 54 are forced downwardly on the nonrotating spindle 24 to provide an excellent seal. The sealing rings are rugged and are expected to exhibit superior wear characteristics. It is also believed that the relatively large volume provided by cavity 34(34') in the hub may play an important role in speeding up the inflation/deflation time of the automatic tire inflation system. The cavity effectively forms a small holding tank capable of delivering a substantial amount of air to the tires. The cavity may also tend to serve as a buffer zone to minimize turbulence in the air stream before it is directed through the relatively small air passageways in the remaining portions of the system. These advantages are especially pronounced in the integral hub design of the latter embodiment.

Figure 4:
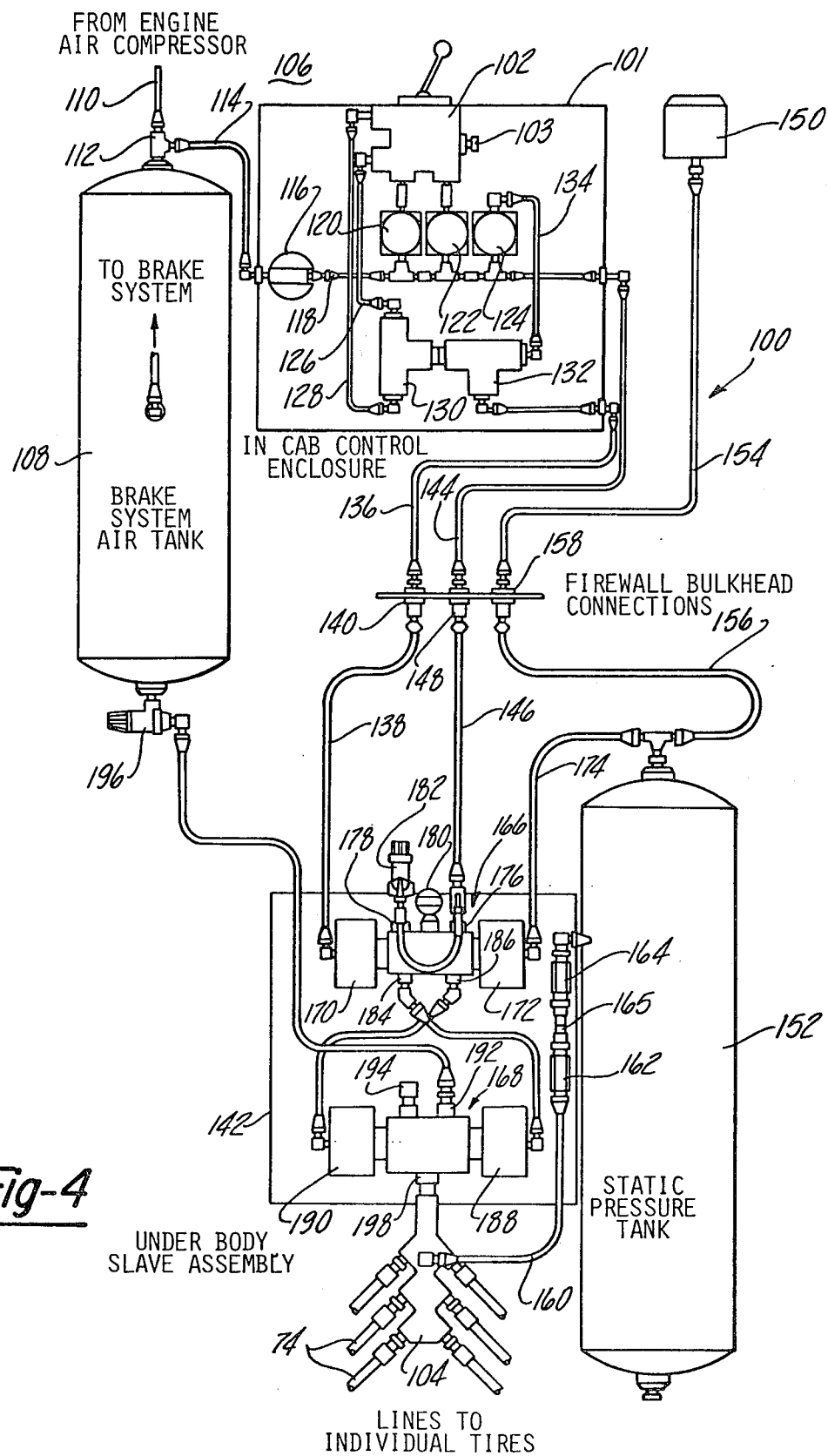
FIG. 4 is a view which pictorially illustrates the control system for regulating the air pressure in the tires pursuant to another aspect of this invention.
Figure 5:
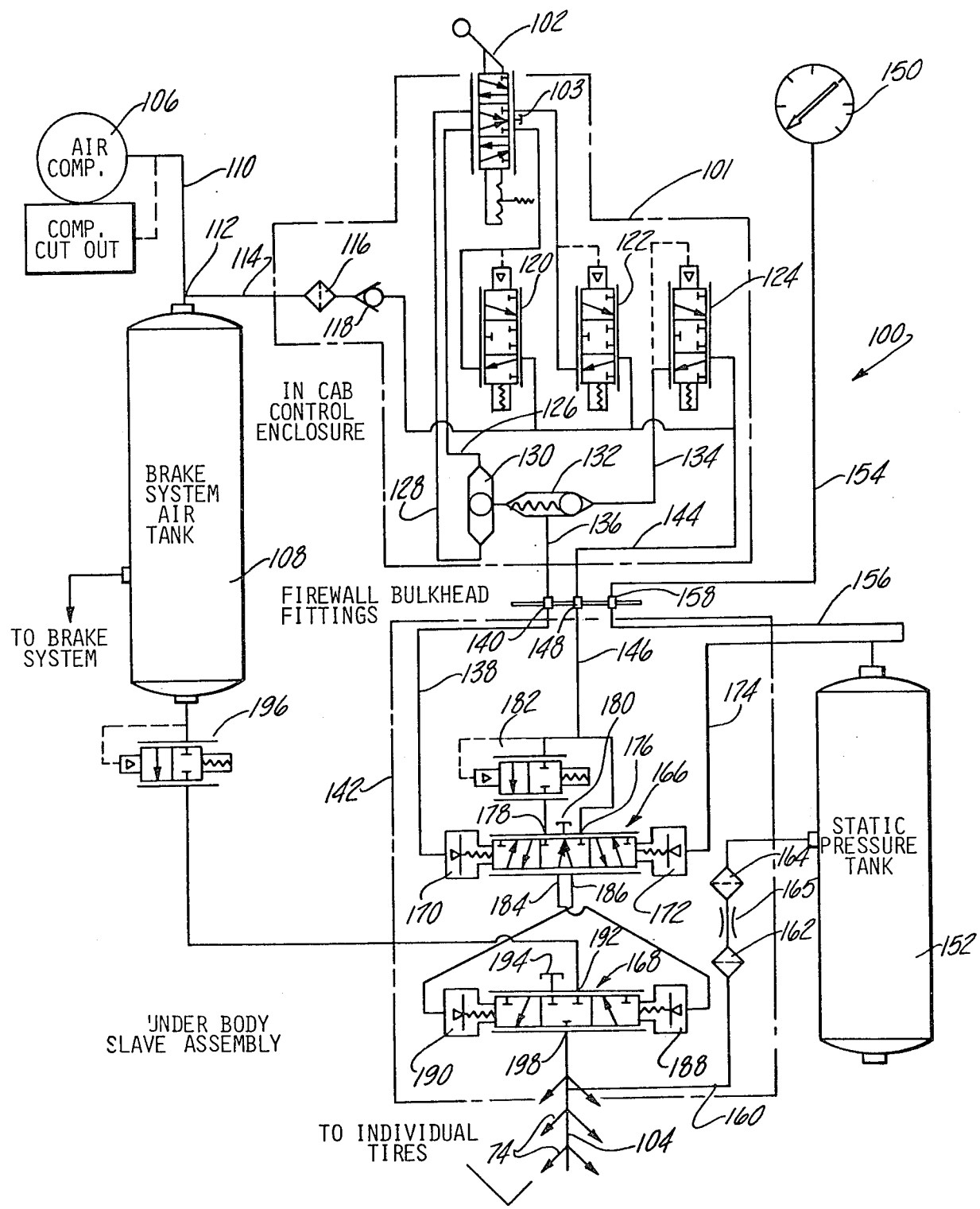
FIG. 5 is a view similar to FIG. 4 which schematically illustrates the pneumatic components of the control system.

Turning now to FIGS. 4 and 5, the automatic control system 100 for regulating the air pressure to the various wheel assemblies will be described. FIG. 4 illustrates the control system in a pictorial manner whereas FIG. 5 schematically represents the various components therein using well known pneumatic symbols. Common elements in these two figures will be referenced by the same numeral where possible.

Like the wheel assembly feature of this invention, the control system is readily adapted for use in conventional military vehicles. In general, the control system employs a control box 101 which is mounted within the cab of vehicle 10. Depending upon the setting of a multi-positioned toggle valve 102, the system operates to inflate or deflate the tires by supplying or exhausting air through manifold 104 which is connected to the respective tires by way of hoses 74. In addition, the control system automatically maintains the tires at the preselected pressure thereby adjusting for increases or decreases in tire pressure due to punctures, increased operating temperatures, etc.

The sole source of air for the control system is from an air compressor 106 which is typically used to supply compressed air to an air tank 108 used in the vehicular air braking system. Air compressor 106 typically generates air pressures in line 110 of about 120 psi.

A minute amount of air from compressor 106 is used as pilot air to control the switching of the inflate/deflate valves. The air can be conveniently bled off from a fitting 112 on an air manifold under the dash which supplies air to the vehicle's accessories such as an air horn or windshield wipers. The term "pilot air" means that it is supplied from a source that is independent of the desired and actual pressure within the tires. The air from compressor 106 is fed through inlet line 114 to the control box in the vehicle cabin.

Inlet line 114 is connected to an air filter 116 which filters dirt and separates water from the air. The output of air filter 116 is connected to a check valve 118 to maintain a constant control pressure in the downstream side of the control system despite fluctuating air pressures delivered by air compressor 106 which can be caused by use of the air brakes or tire inflation. A set of three fixed pressure regulator devices are used to generate preset regulated pressures at their outlets. Pressure regulator device 120 is designed to provide 75 psi pressure at its outlet. Pressure regulator device 122 is designed for 30 psi while pressure regulator 124 generates 10 psi at its output.

The outputs of regulator devices 120 and 122 are connected to input ports of selector device 102. Selector device 102 is a three position toggle valve which operates in one position to connect the output of pressure regulator device 120 to the outlet line 126, while line 128 is exhausted. In a second position the outlet from the 30 psi pressure regulator 122 is connected to outlet line 128, while line 126 is exhausted. In a third position neither of the outputs from regulator devices 120 or 122 are connected to lines 126 or 128, but, instead, lines 126 and 128 are both exhausted through exhaust port 103.

Lines 126 and 128 are coupled to opposite sides of a shuttle valve 130, the output of which is connected to one side of shuttle valve 132. The opposite side of shuttle valve 132 is connected to the output of the 10 psi pressure regulator device 124 over line 134. Shuttle valves 130 and 132 operate under well known principles in which the higher of the two pressures at their inlets are coupled to their respective outlets. For purposes that will be explained later, shuttle valve 132 is biased at about 3 psi such that the air passage from regulator 124 will be closed until the pressure of the other side of valve 132 is 7 psi or less.

Thus, it can be appreciated that the pressure supplied at the outlet of shuttle valve 132 will either be 75, 30 or 10 psi depending upon the position of selector device 102. This selected pressure will be referred to as the control pressure and it is coupled over lines 136 and 138 through firewall bulkhead connection 140 to an inflate/deflate assembly 142. Pilot air is similarly delivered to assembly 142 over lines 144, 146 through bulkhead connection 148. If desired, a tire pressure gauge 150 can also be provided in the vehicle cab. Gauge 150 is connected to a static pressure tank 152 by way of lines 154, 156 through bulkhead connection 158. Static pressure tank 152 is at the current static pressure of the tires. Tank 152 is connected to the tires through manifold 104 by way of inlet line 160 which passes through in line air filters 162, 164 on either side of a fixed orifice 165 which restricts the flow to and from static pressure tank 152 so that the pressure in tank 152 is always the same as that in the tires.

The inflate/deflate assembly 142 employs two rolling diaphragm shuttle valves 166 and 168 which work in a master-slave relationship. Master valve 166 determines whether the tires should be inflated, deflated or remain unchanged as a function of the pressure differential between the desired control pressure and the static pressure within the tires. Slave valve 168 operates to defate or inflate the tires in response to the control decision made by valve 166.

The inputs and outputs of valves 166 and 168 as well as their respective operations can be more easily understood by reference to the schematic of FIG. 5. In FIG. 5 the positions of the pneumatic components therein are all shown with no air pressure in the system, i.e. in a neutral position. With specific references to valve 166, its control inputs 170 and 172 are connected to the selected control pressure over line 138 and the static pressure of the tires over line 174 from static pressure tank 152, respectively. Valve 166 includes two input ports 176, 178 and an exhaust port 180. The pilot air over line 146 is connected directly to input port 176 but passes through a priority valve 182 before entering input port 178. Priority valve 182 is designed to close at pressures less than about 75 psi for the purposes that will later be explained.

Control valve 166 also includes two output ports 184 and 186 which in turn are connected to control inputs 188, 190, respectively, of valve 168. The arrows in the valves shown in FIG. 5 show the interconnections between the input ports and output ports that are made in the three stages of the valve operation. In the neutral stage where pressures on control inputs 170 and 172 are the same, the output ports 184 and 186 are connected back through to the exhaust port 180. When the pressure on control input 170 is greater than that on control input 172, pilot air from input port 176 is connected to output port 186 and output port 184 is connected to exhaust port 180. In contrast, if the static pressure on control input 172 is greater, then the pilot air passing by way of priority valve 182 through input port 178 is connected to output port 184, with output port 186 being exhausted through exhaust port 180.

Valve 168 operates under the same principles. It includes one input port 192 and an exhaust port 194. Input port 192 is connected to the output of the brake system air tank 108 through a priority valve 196. Priority valve 196 operates to close when the pressure within tank 108 falls to below about 75 psi for the reasons that will be explained later herein. The output port 198 of valve 168 is connected to manifold 104 which, as stated before, is connected to the tires through the wheel assemblies 14. When the pressure at control input 190 is greater than that of 188, valve 168 operates to couple the pressurized air from tank 108 through input port 192 to output port 198 to thereby inflate the tires. In contrast, when control input 188 is supplied with higher pressure, the output port 198 is connected to the exhaust port 194 so that the tires are deflated. When the pressures on control inputs 190 and 188 are the same, no inflation or deflation of the tires occurs.

Industrial Applicability

When the engine of vehicle 10 begins running the compressor 106 fills air tank 108 to a pressure of about 90 psi whereupon priority valve 196 opens making air available for tire inflation. Normally, the pressure in tank 108 can increase to a maximum of 120 psi. If the pressure in the brake tank 108 falls below about 75 psi, priority valve 196 closes thereby permitting pressure in the brake tank to build up to a safe operating pressure for the brake system which takes priority over the tire inflation system. Priority valve 196 also insures priority air to the brake system in the event of a major tire system failure.

To inflate or deflate the tires the user places toggle valve 102 into one of the three preset positions. Preferably, the valve 102 is labeled according to terrain or road conditions: one setting (70 psi) for highway conditions, a second setting (30 psi) for cross country, and a third position (10 psi) for mud, sand or snow operation.

Assume that the tires are inflated to 10 psi and the operator switches toggle valve 102 to the position associated with 75 psi. The control system will automatically inflate the tires and maintain them at this pressure without further manual intervention.

The output of the 75 psi pressure regulator 120 is connected by the selected setting of toggle valve 102 to output line 126. Shuttle valve 130 allows only the higher pressure of lines 128 and 126 to pass through, which in this case is 75 psi. Priority shuttle valve 132 similarly allows only the higher of the 10 psi pressure on line 134 or the output of valve 130 to pass through. Consequently, the 75 psi pressure becomes the new control pressure which is coupled via line 138 to the control input 170 of valve 166. Since the right hand control input 172 is at 10 psi (the current static pressure of the tires) valve 166 shuttles to connect pilot air from line 146 through input port 176 and output port 186 to the control input 190 of valve 168. The right hand control input 188 of valve 168 is connected to the exhaust port 180 of valve 166. Since the left hand control input 190 is at a greater pressure than the right hand control input 188, valve 168 shuttles to connect the pressurized air from air tank 108 through port 192 to outlet 198 which, in turn, is coupled to manifold 104. The air is thus allowed to flow into the tires and into static pressure tank 152. The flow through restriction of the fixed orifice 165 is such that the pressure in static tank 152 is the same as any and all tires at all times. When the tires are inflated to 75 psi the pressure in tank 152 is likewise at 75 psi. Thus, the right hand control input 172 of valve 166 now is at the same pressure as the left hand control input 170. This places the system in balance such that valve 166 shuttles to the neutral position (as shown in FIG. 5) and blocks further pilot air from being supplied to the control inputs of valve 168. Thus, valve 168 also shuttles to the neutral position closing off further communication between tank 108 and manifold 104.

Assume that the vehicle now is on soft terrain and the user switches selector device 102 to the third (10 psi) position. With selector device 102 in this position (as shown in FIG. 5) lines 128 and 126 are coupled to the exhaust port 103 of shuttle valve 102. This permits the 75 psi pressure in the lines leading to control input 170 of valve 166 to be released back through the exhaust port 103. The released downstream pressure in shuttle valve 132 must fall below about 7 psi before valve 132 shuttles to allow the accurately controlled 10 psi air from pressure regulator 124 to instead pass through to control valve 166. This produces an accurate 10 psi control pressure that may not otherwise be possible with a standard (unbiased) shuttle valve in this position due to hystersis effects.

With 10 psi now applied to control input 170 of valve 166 and 75 psi still applied to the right hand control input 172, the system no longer is in balance. Control valve 166 is then shuttled to the left connecting pilot air from input port 178 to outlet port 184 which is connected to the right hand control input 188 of valve 168. This causes valve 168 to similarly shuttle to the left to connect manifold 104 to the exhaust port 194. In such manner air is allowed to flow from the tires and static pressure tank 152 into the atmosphere until the pressures on both sides of control valve 166 are the same, i.e. 10 psi. At that time valve 166 shuttles to its neutral position cutting off pilot air to valve 168 which, in turn, also shuttles to its neutral position cutting off all air flow. The control pressure, the pressure in the tires, static tank pressure and tire pressure gauge are now all equal to 10 psi.

Provision is also made for preventing unwanted tire deflation in the event that there is a loss of air pressure which controls the valving arrangement of the control system. This pressure loss can possibly occur when the vehicle is parked for a period of time causing the brake tanks to bleed down creating a pressure loss. Also, a break in the control lines would cause a loss of control pressure. Under these conditions, priority valve 182 prevents unwanted tire deflation. Priority valve 182 is connected between the pilot air line 146 and the inlet port 178 of valve 166 which is used in the deflate mode to provide pressure to the right hand control input of valve 168. Priority valve 182 is designed to close at 75 psi. Accordingly, if the pilot air pressure should drop below 75 psi, no pilot air would pass through valve 166 to valve 168 thereby preventing valve 168 from shuttling to the deflate stage.

It should also be realized that the control system of the present invention automatically maintains the preselected desired air pressure within the tires even though conditions in the tires may change. For example, if there is a slow leak or puncture in the tires, static pressure tank 152 will fall below the preselected pressure thereby causing valve 166 and 168 to enter into the inflate mode as necessary to maintain the desired pressure. Similarly, if the temperature in the tires increases so as to increase the pressure therein beyond the preselected temperature, the valving arrangement of the control system of the present invention will automatically deflate the tires until the desired pressure is reached. All this is accomplished without any further manual intervention from the operator.

Those persons experienced in the art can now appreciate that the present invention offers several significant advantages over known central tire inflation systems. The present system is truly automatic and requires no operator intervention aside from moving the toggle switch to the position associated with the terrain on which the vehicle is riding. Once the selection has been made the system automatically adjusts and maintains the tires at that selected pressure. The system also operates very quickly. It is capable of deflating all of the tires (six 14.00×20 tires) to 10 psi from 75 psi in three minutes and forty seconds, much more quickly than known inflation systems. This is because the slave valve 168 is quickly shuttled to its full operational positions once the inflate/deflate decision has been made by master valve 166. Both the wheel assembly and air regulating control system are extremely cost effective utilizing a minimum number of components. Additionally, the tire inflation system of the present invention can be readily adapted to conventional military vehicles with a minimum amount of modification. All of these advantages result while at the same time providing excellent reliability even under adverse conditions. The rotating air coupling of the present invention is isolated from adverse road conditions since it is interiorly located and it is provided without cutting into load bearing structures or disturbing the wheel bearings.

Pursuant to another aspect of this invention various components of the just described automatic tire inflation system may be incorporated as part of a kit for retrofitting vehicles to include such a system. The number of components in the kit will depend upon the type of vehicle to be retrofitted and the extent of inventory of the various parts that the user wishes to maintain. For example, the kit may include all new replacement parts for either one of the wheel assemblies of the two embodiments together with all of the new parts necessary to employ the valve control system 100. It should be noted that the air compressor tank 108 normally will not be required since it is standard equipment on most vehicles employing air brakes. The vehicles may also already employ wheel assemblies which are capable of accepting an automatic tire inflation system but for reasons of economy the vehicle does not include the valve control system. This would permit a manufacturer to mass produce a certain vehicle and then selectively choose which one of those vehicles should include an automatic tire inflation system. Consequently, those vehicles which will be used on certain terrain may be so modified while other vehicles used in less demanding applications are not. In those instances the inlets and outlets of predrilled wheel assemblies will generally be plugged. The retrofitting kit would then include the parts making up the valve control system only. The plugs can be removed in the wheel assemblies and the valve control system readily added to thereby equip the vehicles with an automatic tire inflation system.

Those skilled in the art will appreciate that the design of the present invention lends itself to easy incorporation into existing vehicles. The control box 101 can be readily mounted in the cab and the various pressure lines routed from the cab through the normal fire wall of the vehicle as shown in the drawings. The valve assembly 142 and manifold 104 is then mounted at a convenient location on the frame of the vehicle, as is the static pressure tank 152. The various air lines can be easily interconnected at appropriate locations to finish the retrofitting operation. As noted above, the contents of the kit may vary somewhat since the user may have flexible air hoses, couplings, tanks, etc. in stock. In those instances the kit would just contain the control box 101 and the valve assembly 142.

Other modifications of the present invention will become apparent to one skilled in the art after a study of the drawings, specification and following claims.

We claim:

1. In an automatic tire inflation/deflation system having a plurality of wheel assemblies for the tires of a vehicle, each wheel assembly having a rotatable portion connected to its associated tire and a nonrotatable portion connected to the vehicle, the improvement comprising:
a nonrotatable elongated annular spindle;
a hub having an enlarged central interior cavity, said hub being mounted for rotation about said spindle on a pair of spaced bearings;
an axle passing through said spindle and connected to the hub;
a pair of annular sealing rings, each sealing ring having a channel-like cross section with a substantially rigid body and a generally horizontally extending flexible lip portion about its inner periphery;
receiving means in the rotating portion of the wheel assembly on both sides of said cavity and inboard of said bearings, adapted to hold the body of said sealing rings laterally in place so that their respective lip portions ride on the spindle; and
means defining a sealed air passageway through which tire inflation air may pass during both inflation and deflation of the tire, said passageway extending from an inlet in inner portions of the spindle to an outlet in exterior portions of the hub, said passageway including an opening in said spindle beween the lip portions of said seals and further including said cavity.

2. The improvement of claim 1 which further comprises:
an annular sleeve having outer edges thereof connected to the hub so as to bridge the central cavity therein, said sleeve having an opening forming part of said air passageway; and
wherein said receiving means are formed in an inner annular surface of said sleeve.

3. The improvement of claim 1 wherein said receiving means are formed directly in an inner annular surface of said hub.

4. The improvement of claims 2 or 3 wherein said receiving means is defined by a pair of shoulders, one on each side of said cavity; a pair of grooves, each groove being adjacent and outboard of said shoulders; and a snap ring in each of said grooves.

5. The improvement of claim 1 wherein the lip of each sealing ring includes a radially extending portion made of polytetraflouroethylene riding on the spindle.

6. The improvement of claim 1 wherein outer portions of the body of said sealing rings are coated with a rubbery material.

7. Apparatus for modifying a conventional wheel assembly for use with an automaic tire inflation/deflation system, said wheel assembly including a non-rotatable elongated annular spindle, a hub having a central interior cavity, said hub being mounted for rotation about said spindle on a pair of spaced bearings and an axle passing through said spindle and connected to the hub, wherein said apparatus comprises:
an annular sleeve of sufficient length so that the outer edges thereof may be connected to the hub so as to bridge the central cavity therein inboard of said bearings;
a pair of annular sealing rings with a channel-like cross section, said sealing rings having a generally rigid body and flexible lip portion defining a generally horizontally extending inner periphery of said sealing rings;
receiving means located about an inner surface of said sleeve, adapted to hold the body of said sealing rings in a spaced apart relationship with the lip portions thereof riding on said spindle; and
means defining a sealed air passageway through which tire inflation air may pass during both inflation and deflation of the tire, said passageway including an opening in the spindle between the sealing rings and an opening in the sleeve communicating with said cavity.

8. In an automatic tire inflation/deflation system having a plurality of wheel assemblies for the tires in a vehicle, each wheel assembly having a rotatable portion connected to its associated tire and a nonrotatable portion connected to the vehicle, and means defining a sealed air passageway between an inlet in the nonrotatable portion and an outlet in the rotatable portion, the improvement comprising:
a non-rotatable elongated annular spindle having an interior end connected to the vehicle;
a hub having a central interior cavity, said hub being mounted for rotation about said spindle on a pair of spaced bearings;
an axle passing through spindle and connected to the hub;
an annular sleeve having outer edges thereof connected to the hub so as to bridge the central cavity therein inboard of said bearings;
a pair of sealing rings having their outer peripheral surfaces in contact with said sleeve and inner peripheral surfaces riding on said spindle; and
a sealed air passageway through which tire inflation air may pass during both inflation and deflation of the tire, said passageway extending from an inlet in means defining inner portions of the spindle to an outlet in exterior portions of the hub, said air passageway being defined by a first bore extending substantially the length of said spindle with the inner end of said first bore communication with said inlet, a first opening passing orthogonally through said spindle and meeting said first bore, a second opening through the sleeve into the central cavity, and a second bore extending from the outlet of the hub into the central cavity therein; and
means for connecting said outlet to the tire.

9. In an automatic tire inflation system having a plurality of wheel assemblies for tires in a vehicle, each wheel assembly having a rotatable portion connected to its associated tire and a nonrotatable portion connected to the vehicle, the improvement comprising:
a nonrotatable elongated annular spindle;
a single piece of metal serving as a hub, said hub having an annular surface defining a central passageway through which said spindle passes, said hub being mounted for rotation about said spindle on a pair of spaced bearings;
an axle passing through said spindle and connected to the hub;
said hub having a centrally located enlarged interior cavity surrounding said spindle, first and second grooves on opposite sides of the cavity formed in said annular surface of the hub, first and second shoulders formed in said annular surface between said cavity and the first and second grooves, respectively, said grooves and shoulders being located between said pair of bearings;
first and second snap rings, one in each of said first and second grooves;
a pair of annular sealing rings each sealing ring having a channel-like cross section with a substantially rigid body and a generally horizontally extending lip portion about its inner periphery, one sealing ring being laterally held in place between said first shoulder and first snap ring and the other sealing ring being held in place between said second shoulder and second snap ring, with the lip portions of the respective sealing rings riding on said spindle;
means defining a sealed air passageway from an inlet in inner portions of the spindle and an outlet in the hub; and
whereby said sealing rings provide air seals to prevent air from escaping between the central cavity in the rotating hub and the nonrotating spindle, said sealing rings being located inboard of the bearing to protect them from adverse environmental conditions.

10. The improvement of claim 9 wherein said air passageway is defined by first bore extending substantially the length of said spindle, with the inner end of said first bore communicating with said inlet, a first opening passing orthognonally through said spindle between said sealing rings and meeting said first bore, and a second bore extending from the outlet of the hub into the central cavity therein.

* * * * *